United States Patent
Dorfman

(10) Patent No.: US 7,338,622 B2
(45) Date of Patent: *Mar. 4, 2008

(54) THICK FILM COMPOSITIONS FOR USE IN ELECTROLUMINESCENT APPLICATIONS

(75) Inventor: Jay Robert Dorfman, Durham, NC (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 845 days.

This patent is subject to a terminal disclaimer.

(21) Appl. No.: 10/728,335

(22) Filed: Dec. 4, 2003

(65) Prior Publication Data

US 2005/0123675 A1  Jun. 9, 2005

(51) Int. Cl.
*H01B 1/20* (2006.01)
*B05D 5/12* (2006.01)
*H01J 1/62* (2006.01)

(52) U.S. Cl. .................. 252/511; 252/514; 106/287.29; 428/917; 427/58; 427/66; 313/506

(58) Field of Classification Search ................ 252/511, 252/512, 514, 518.1, 301.4 P; 428/917; 313/463, 506; 106/287, 29; 524/904, 910; 427/58, 66
See application file for complete search history.

(56) References Cited

U.S. PATENT DOCUMENTS

| 5,405,912 | A | * | 4/1995 | Simkin | 525/199 |
| 5,653,927 | A | * | 8/1997 | Flynn et al. | 264/134 |
| 6,445,128 | B1 | | 9/2002 | Bush et al. | |
| 6,787,993 | B2 | | 9/2004 | Bush et al. | |
| 6,939,484 | B2 | * | 9/2005 | Dorfman | 252/514 |

OTHER PUBLICATIONS

Hylar XPH-582 Preliminary Data Sheet (Copyright 2005), solvay Solexis.*

* cited by examiner

*Primary Examiner*—Mark Kopec

(57) ABSTRACT

The present invention relates to a thick film composition comprising: a) functional component; b) PVDF/HFP polymer resin, a copolymer of PVDF/HFP polymer resin, or mixtures thereof; dissolved in c) organic solvent, with the provisos that the PVDF/HFP resin has i) a melt viscosity of 0.2-0.7 kPoise and ii) a DSC melt temperature in the range of 85-98° C.

10 Claims, No Drawings

THICK FILM COMPOSITIONS FOR USE IN ELECTROLUMINESCENT APPLICATIONS

FIELD OF THE INVENTION

The invention is directed to improved polymer thick film compositions and in particular to the use of such compositions in electroluminescent (EL) applications.

BACKGROUND OF THE INVENTION

This invention relates to screen-printable electroluminescent (EL) thick film compositions and their use in the formation of EL panels or lamps. The terms "panel" and "lamp" are meant to be equivalent.

An EL lamp or panel is typically constructed using ITO (Indium Tin Oxide) sputtered polyester (PET) as the base substrate. Typical thicknesses of the ITO-sputtered PET are 5.0 to 7.0 mils. The actual ITO thicknesses range from about 750-1500 nm. A phosphor-containing layer is then screen-printed on to the ITO-sputtered polyester and then dried at approximately 130° C. for 5-10 minutes in either a box oven or a belt-driven oven. The phosphor used is typically a transition metal-doped ZnS. Next, a dielectric layer is screen-printed and dried as above. Usually, two dielectric layers are deposited and dried. Finally, a rear electrode conductor layer is printed and dried as above to form the completed lamp. As constructed, an EL lamp is basically a capacitor, with the ITO layer functioning as a clear conductive layer which enables the light emitted by the phosphor layer to pass through the front of the lamp with little or no attenuation. These lamps typically run on AC (alternating current).

The screen-printable inks or pastes used to fabricate an EL lamp are composed of a resin or polymer dissolved in a solvent, and a functional component which helps impart the particular functionality for a given composition. The resins used in the vast majority of current EL lamps belong to the general class known as fluoropolymers. Other resins such as cyanoethylated starches or epoxies have also been employed. Unfortunately, due to solubility problems, the preferred glycol ethers cannot typically be used. As noted above, the phosphor paste contains ZnS particles suspended in the resin/solvent solution, the latter to be referred to as a medium. The dielectric or insulating layer paste contains a high dielectric constant material such as Barium Titanate powder dispersed in a fluoropolymer-based medium.

The rear electrode silver paste is composed of silver flake dispersed in a medium as defined above, while a carbon electrode paste uses conductive carbon black and graphite dispersed in the appropriate medium. The use of carbon as a rear electrode is more prevalent due to the lower cost of the material and the tendency for silver to migrate in the presence of water when the EL lamp is placed under bias.

Carbon electrodes may be substituted for silver electrodes without much sacrifice in performance when constructing small EL lamps (eg. 2×2 inches). For larger lamps, the use of a silver electrode would be desirable in that the lower-resistivity silver leads to a more uniformly-lit EL lamp.

The following patents demonstrate the state of the prior art.

U.S. Pat. No. 6,445,128 to Bush et. al. discloses an EL panel made with PVDF/HFP copolymer resin binder, in substantially an uncrosslinked form, with DMAC solvent and/or other higher boiling point solvents/latent solvents/extenders. The resin binder is characterized by a melt viscosity of 1.0-8.5 kP and a Differential Scanning Calorimeter (DSC) melt temperature of 103-115° C.

Since EL lamps degrade exponentially over time, it is a key concern to find new ways to decrease this degradation thus improving lamp lifetime. The rate of degradation is related to the voltage/frequency the lamp is run at, and the temperature/humidity the lamp is exposed to. The higher the voltage/frequency, the worse the degradation is. Similarly, the higher the temperature/humidity is, the worse the degradation. A desirable improvement in EL lamps would then be to extend the usable lifetime. That is, since EL lamps are usually monitored according to the percentage of their original brightness, a lamp that has 50% of its initial brightness after 200 hours is more useful than a lamp that has 50% of its initial brightness after 100 hrs. Extending the lifetime would open new markets for EL lamps. Facilitating the use of the polymers by making them more soluble in common solvents such as glycol ethers would also be very desirable.

In view of the above, it is therefore the object of this invention to provide screen-printable pastes for use in fabricating EL lamps which exhibit improved or extended lifetimes.

Another object of this invention is to produce brighter EL lamps using silver as the rear electrode.

Further, an additional object of this invention is to produce screen-printable pastes for EL lamps that utilize silver as a rear electrode and do not exhibit significant silver migration.

A further object of this invention is to provide screen-printable pastes for EL lamps that contain a co-polymer of PVDF/HFP as an integral part of the medium of at least one such paste in the lamp construction.

Yet another object of this invention is to provide screen-printable pastes for EL lamps that have stable solution viscosities and do not lead to increased incidences of "short circuits" as the solution ages and are soluble in glycol ether solvents.

We have unexpectedly found that significant advantages can be observed with PVDF/HFP copolymers when both the melt temperature and melt viscosities are significantly different from the ranges of values noted in the prior art. It has been found that the solution viscosities of the PVDF/HFP copolymers used in the present invention are much more stable over time than those defined in the prior art. This is a significant improvement in that the tendency to have "short circuits" occur over time is drastically reduced using the PVDF/HFP copolymers noted herein as compared with those in the prior art.

SUMMARY OF THE INVENTION

The present invention relates to a thick film composition comprising: a) functional component; b) PVDF/HFP polymer resin, a copolymer of PVDF/HFP polymer resin, or mixtures thereof; dissolved in c) organic solvent, with the provisos that the PVDF/HFP resin has i) a melt viscosity of 0.2-0.7 kPoise and ii) a DSC melt temperature in the range of 85-98° C.

The invention further relates to a method of forming an electroluminescent panel comprising: (a) providing a substrate; (b) depositing at least one layer of a phosphor-containing thick film composition onto said substrate; (c) depositing at least one layer of a dielectric thick film composition onto the layer of (b); and (d) depositing at least one layer of a conductive thick film composition onto the layer of (c); wherein at least one layer of (b), (c) or (d)

contains a PVDF/HFP polymer resin, copolymer of a PVDF/HFP polymer resin, or mixtures thereof which has i) a melt viscosity of 0.2-0.7 kPoise and ii) a DSC melt temperature in the range of 85-98° C.

DETAILED DESCRIPTION OF INVENTION

The present invention may be used to produce the compositions, which make-up each of the layers described above in the formation of an EL lamp, as follows: 1) phosphor-containing paste composition; 2) a dielectric or insulating paste composition; 3) a carbon electrode paste composition; or 4) a silver electrode paste composition.

These thick film compositions comprise a functional component that imparts the appropriate functional properties to the composition. The functional component, for example, may be comprised of electrically conductive particles, particles imparting dielectric properties, or phosphors which allow for the radiation of light in the presence of an electrical field.

These functional components are dispersed in an organic medium that acts as a carrier for the functional phase. The organic medium is comprised of polymer or resin components dissolved in a solvent.

The main components of the thick film composition(s) of the present invention are discussed herein below.

A. Functional Component

The functional component(s) in the present thick film composition(s) may be 1) phosphor or phosphor containing particles; 2) dielectric or insulating particles, such as Barium Titanate and Titanium Dioxide, or 3) conductive particles such as silver, graphite, carbon, or mixtures thereof. The particle diameter and shape of the functional component is not particularly important as long as it is appropriate to the application method.

The particle size distribution of the functional component is not itself critical with respect to the effectiveness of the invention. However, as a practical matter, it is preferred that the particles size be in the range of 0.1 to 50 microns and preferably 0.1 to 20 microns.

B. Organic Medium

The organic medium of the present invention is not conventional in the art, is a solution of polymer in solvent(s), and lends unique properties to the composition. Furthermore, the polymer resin of the present invention must be soluble in the organic solvent.

The polymer resin of the present invention is particularly important. The resin used in the present invention is a member of the fluorocarbon-resin family, polyvinylidene Fluoride (PVDF/HFP) and copolymers thereof, made by polymerizing 1,1-difluoroethylene, $H_2C=CF_2$, a colorless gas. The resin is thermally stable to high temperatures, is stronger and more abrasion-resistant than other fluoroplastics, and is easier to process on conventional thermoplastics equipment. Additionally, the polymer resin of the present invention is characterized by the following physical characteristics: (1) melt viscosity of 0.2-0.7 kPoise; (2) DSC melt temperature of 85-98° C.; and (3) mole % of hexafluoropropylene (HFP) in total resin composition of 12-16%. The molecular weight of the resin is in the range of 100,000 to 200,000. As shown by the melt viscosity and DSC melt temperature, the selection of molecular weight range that is made in the present invention has shown surprising results over U.S. Pat. No. 6,445,128 to Bush et. al. In fact, FIG. 4 of the Bush patent points out their disclosed suitable ranges for melt viscosity and DSC melt temperature (col. 6, ln. 22-55) for use in EL lamps.

The most widely used solvents found in thick film compositions are ethyl acetate and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate can be included in the vehicle. The preferred mediums are based on glycol ethers and β-terpineol. Various combinations of these and other solvents are formulated to obtain the viscosity and volatility requirements desired.

C. Additional Components

Additional components may be added to the composition(s) of the present invention to impart desired properties. For example, an adhesion promoter or flow additive may be added. Examples of typical adhesion promoters include acrylic-containing mediums. Typical flow additives include products such as Modaflow® available from Solutia, Inc.

D. Formation of Composition(s)

Typically, the functional components, detailed above, are mixed with the organic medium (vehicle) by mechanical mixing to form a pastelike composition, called "pastes", having suitable consistency and rheology for printing. The organic medium must be one in which the solids are dispersible with an adequate degree of stability. The Theological properties of the medium must be such that they lend good application properties to the composition. Such properties include: dispersion of solids with an adequate degree of stability, good application of composition, appropriate viscosity, thixotropy, appropriate wettability of the substrate and the solids, a good drying rate, and a dried film strength sufficient to withstand rough handling.

The solids are mixed with the organic medium by mechanical mixing using a planetary mixer, then dispersed on a three roll mill to form a paste-like composition having suitable consistency and rheology for screen printing. The latter is printed as a "thick film" on substrates in the conventional manner as known to those in the art of thick film technology.

The ratio of organic medium in the thick film composition to the inorganic solids in the dispersion is dependent on the method of applying the paste and the kind of organic medium used. Normally to achieve good coverage, the dispersions will contain complementarily 50-91% wt. inorganic solids and 50-9% wt. vehicle, as described above. The compositions of the present invention may, of course, be modified by the addition of other materials, which do not affect its beneficial characteristics. Such formulations are well within the state of the art.

The pastes are conveniently prepared on a three-roll mill. The viscosity of the pastes is typically within the following ranges when measured on a Brookfield HBT viscometer at low, moderate and high shear rates:

E. Application

The pastes of the present invention may be utilized in the formation of electroluminescent panels or lamps as described herein below. A base substrate is provided which is typically constructed of ITO (Indium Tin Oxide) sputtered polyester (PET).

| Shear Rate (RPM) | Viscosity (Pa * s) | |
| --- | --- | --- |
| 0.5 | 50-2500 | |
| | 150-1000 | Preferred |
| | 300-750 | Most Preferred |
| 10 | 20-200 | |
| | 50-125 | Preferred |
| | 60-100 | Most Preferred |
| 100 | 5-75 | |
| | 12.5-60 | Preferred |
| | 25-50 | Most Preferred |

EXAMPLES

This invention will now be described in further detail with practical and comparative examples (Examples 1 and 2).

Key for Polymer Resins Used in Examples

Experimental VDF/HFP copolymer: Available from Solvay Solexis—Thorofare, N.J.; Copolymer of PVDF/HFP; Melt viscosity 0.45 kP; Melt temperature 94° C.

HYLAR® SN™: Available from Ausimont USA; Copolymer of PVDF/HFP; Melt viscosity 4.5 kP; Melt temperature 109° C.

KYNAR® 9301: Available from Atofina Corp.; Terpolymer of PVDF/PTFE/HFP; Melt viscosity 1.7 kP; Melt temperature 90° C.

Note that KYNAR® 9301 is not a copolymer of PVDF/HFP as are the HYLAR® resins.

Example 1

A medium was prepared by dissolving 35.0 g. of experimental VDF/HFP copolymer (available from Solvay Solexis—Thorofare, N.J.) in 65.0 g. of carbitol acetate solvent (obtained from Eastman Chemical) while being heated to approx. 100 C with stirring for 2 hours. All resin dissolved to produce a clear solution. This solution will be referred to as the experimental VDF/HFP copolymer medium.

The above medium was then used to produce a phosphor-containing paste (A), a dielectric or insulating paste (B), a carbon electrode paste (C), and a silver electrode paste (D) as well. These thick film pastes were made as follows:

(A) 60.0 g. of EL phosphor (obtained from Osram Sylvania as type ANE 430) was mixed with 37.25 g. of the experimental VDF/HFP copolymer medium noted above, 2.5 g. of an acrylic-containing medium, and 0.25 g. of a flow additive. The components were mixed at medium speed for 30 minutes. A yellow-green paste resulted.

(B) 47.25 g. of the experimental VDF/HFP copolymer medium was mixed with 37.5 g. of barium titanate powder, 12.5 g. of titanium dioxide powder, 2.5 g. of an acrylic-containing medium, and 0.25 g. of a flow additive. These components were mixed for approx. 45 minutes and then subjected to several passes on the three-roll-mill. A white paste resulted.

(C) 5.0 g. of conductive carbon (obtained from Cabot Corp) was mixed with 14.0 g. of graphite (obtained from Dixon Corp), 0.5 g. of a flow additive, and 80.5 g. of the above VDF/HFP copolymer medium. The components were mixed for approx. 45 minutes, and then subjected to several passes on the three-roll-mill. A black paste resulted.

(D) 60.0 g. of silver flake (DuPont made; average particle size 7 microns) was mixed with 34.75 g. of the experimental VDF/HFP copolymer medium, 5.0 g. of an acrylic-containing medium, and 0.25 g. of a flow additive for approx. 30 min., and then subjected to several passes on the three-roll-mill. A silver-colored paste resulted.

An EL lamp was constructed according to standard procedures. The starting substrate used for all examples was 200 ohm 7.0 mil thick ITO-sputtered PET obtained from CPFilms, Inc. A 200 mesh stainless steel screen was used to print each layer.

After each layer was screen-printed, it was dried at 130 C for 10 min. in a box oven.

One layer of (A), two layers of (B), and one layer of (D) was thus processed as detailed above. EL lamps were then powered at 115V/400 Hz AC and the initial brightness or luminance was measured. After this measurement, the parts were aged at 60° C./90% R.H. for hundreds of hours and brightness measurements were taken. As a comparison, the entire above sequence was reproduced, and EL lamps were made, with the exception that instead of the experimental VDF/HFP copolymer being used, another fluoropolymer was used. Namely, a terpolymer of PVDF/PTFE/HFP was used which is commercially available as KYNAR® 9301 available from Atofina, Corp.

The results of the above aging study are given below:

| Time @ 60 C./90% R.H. (hrs) | Brightness (Experimental VDF/HFP copolymer System) | Brightness (KYNAR ® System) |
| --- | --- | --- |
| 0 | 66.9 cd/m2 | 46.6 cd/m2 |
| 25 | 49.5 | 39.6 |
| 48 | 47.8 | 34.6 |
| 76 | 41.5 | 27.5 |
| 94 | 38.5 | 23.6 |
| 145 | 33.4 | 17.8 |
| 190 | 31.9 | 15.9 |

Additionally it was noted that the experimental VDF/HFP copolymer group showed much less staining or blemishing as compared with the KYNAR® group indicative of much reduced silver migration. As the data above shows, the lifetime of the experimental VDF/HFP copolymer group has been extended compared with the KYNAR® group (48% of initial brightness vs. 34%) after 190 hours of accelerated aging. Further, the actual brightness values have been doubled after this time period (31.9 vs. 15.9 cd/m2). This is a significant and unexpected improvement.

Example 2

An attempt was made to use HYLAR® SN™ resin (commercially available for Ausimont, USA.) as per the above procedures for comparison purposes. However, all attempts to fabricate EL lamps always resulted in a degree of shorted lamps. Typical yields using this resin were 60-95% initially, and over time, this yield always decreased. Yields using experimental VDF/HFP copolymer as the resin for the lamps were always near 100%. A comparison of the solution viscosities of HYLAR® SN™ vs. experimental VDF/HFP copolymer as a function of time indicated an unexpected and significant difference:

| Time (hours) | HYLAR® SN™ Viscosity (% Change) | Experimental VDF/HFP Copolymer Viscosity (% Change) |
|---|---|---|
| 0 | 0 | 0 |
| 72 | 176 | 10 |
| 144 | 624 | 17 |
| 720 | 550 | 35 |

All measurements above were performed with a Brookfield RVT viscometer, using a #14 spindle, at 10 RPM, @25 C.

The results clearly show that the HYLAR® SN™ is less stable over time. Note a 550% increase in viscosity for HYLAR® SN™ vs. an approximate 35% increase for the experiment VDF/HFP copolymer over a period of a month. The large increase in viscosity noted for HYLAR® SN™ appears to correlate well with the incidence of shorting seen over time. It would appear that some of the HYLAR® SN™ resin either precipitates out or some "gel structure" forms over time. No such phenomenon is seen with the experimental VDF/HFP copolymer, yet all of the aforementioned advantages are still maintained (extended lifetime, reduced silver migration, etc.). This would seem to indicate that use of the experimental VDF/HFP copolymer is much preferred over HYLAR® SN™ for use in pastes in EL lamps. Note that HYLAR® SN™ has a melt viscosity much different than that of the experimental VDF/HFP copolymer (midrange value 4.5 kP vs. 0.45 kP) and a much different melt temp as well (midrange value 109° C. vs. 94° C.).

What is claimed is:

1. A thick film composition comprising:
   a) functional component;
   b) PVDF/HFP polymer resin, a copolymer of PVDF/HFP polymer resin, or mixtures thereof; dissolved in
   c) organic solvent.

with the provisos that the PVDF/HFP resin has i) a melt viscosity of 0.2-0.7 kPoise and ii) a DSC melt temperature in the range of 85-98° C.

2. The composition of claim 1 wherein said functional component is selected from silver, carbon, graphite or mixtures thereof.

3. The composition of claim 1 wherein said functional component is selected from phosphor, phosphor-containing particles, or mixtures thereof.

4. The composition of claim 1 wherein said functional component is selected from $BaTiO_3$, $TiO_2$, or mixtures thereof.

5. The composition of claim 1 wherein the PVDF/HFP resin contains 12-16 mole % of hexafluoropropylene (HFP) in the total resin composition.

6. The composition of claim 1 further comprising an adhesion promoter.

7. The composition of claim 1 further comprising a flow additive.

8. The composition of claim 1 wherein the organic solvent is selected from the group consisting of carbitol acetate.

9. An electroluminescent panel utilizing the composition of any one of claims 1-8.

10. A method of forming an electroluminescent panel comprising:
    (a) providing a substrate;
    (b) depositing at least one layer of a phosphor-containing thick film composition onto said substrate;
    (c) depositing a least one layer of a dielectric thick film composition onto the layer of (b); and
    (d) depositing at least one layer of a conductive thick film composition onto the layer of (c);
    wherein at least one layer of (b), (c) or (d) contains a PVDF/HFP polymer resin, copolymer of a PVDF/HFP polymer resin, or mixtures thereof which has i) a melt viscosity of 0.2-0.7 kPoise and ii) a DSC melt temperature in the range of 85-98° C.

* * * * *